Figure 1:
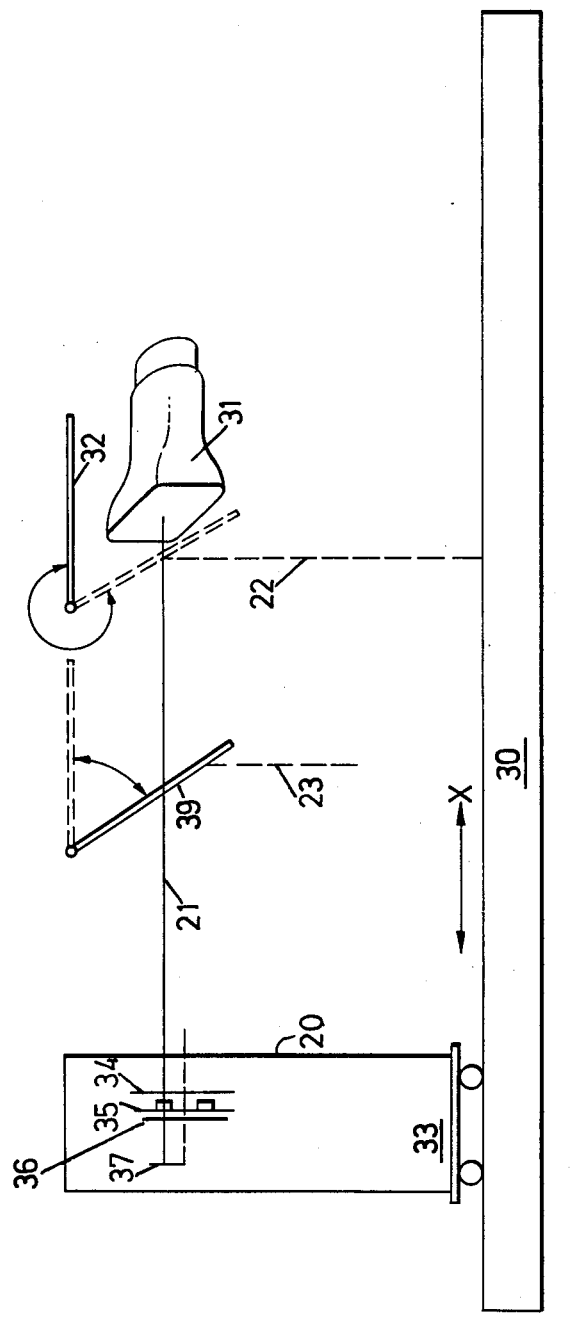

United States Patent [19]

Spence-Bate

[11] 4,074,935
[45] Feb. 21, 1978

[54] ALTERNATIVE CAMERA ARRANGEMENT

[76] Inventor: Harry Arthue Hele Spence-Bate, 115 Cheam Plate, Morley, Australia, 6062

[21] Appl. No.: 595,867

[22] Filed: July 14, 1975

[30] Foreign Application Priority Data

July 17, 1974 Australia .............................. 8236/74

[51] Int. Cl.² ...................... G03B 27/44; G03B 27/76; G03B 27/70; G03B 27/32
[52] U.S. Cl. .............................. 355/46; 355/20; 355/60; 355/64
[58] Field of Search .......................... 355/45, 21, 60, 20, 355/57, 43, 46, 64–66, 73; 354/75–77, 96, 117; 352/79

[56] References Cited

U.S. PATENT DOCUMENTS

| | | | |
|---|---|---|---|
| 1,268,609 | 6/1918 | Powell | 355/60 |
| 1,347,824 | 7/1920 | Pifer | 355/73 |
| 1,644,781 | 10/1927 | Holman et al. | 355/66 |
| 2,480,423 | 8/1949 | Simmon | 355/20 |
| 3,276,312 | 10/1966 | Florsheim | 355/73 X |
| 3,369,448 | 2/1968 | Dacquay | 355/60 |
| 3,459,888 | 8/1969 | Sokolov | 355/46 X |
| 3,511,565 | 5/1970 | Harman et al. | 355/64 X |
| 3,587,419 | 6/1971 | Blazek et al. | 354/76 |
| 3,642,366 | 2/1972 | Kawakubo | 355/66 |
| 3,647,955 | 3/1972 | Reader et al. | 355/20 X |
| 3,673,932 | 7/1972 | Rottmiller | 355/66 X |
| 3,673,936 | 7/1972 | Stone et al. | 355/20 X |
| 3,709,603 | 1/1973 | Furuichi | 355/66 |
| 3,751,593 | 8/1973 | Rychlewski et al. | 352/79 X |

FOREIGN PATENT DOCUMENTS 1,064,218  5/1954  France ................... 355/66

*Primary Examiner*—Donald A. Griffin
*Attorney, Agent, or Firm*—Fidelman, Wolffe & Waldron

[57] ABSTRACT

A microfiche or microfilm camera including a copying table for holding a record to be copied, the camera being provided with a mirror arranged to deflect the optical path between the camera lens and copying table through 90° and a cathode ray tube or laser means arranged to supply an alternative source of image to be copied to the record at the copying table; in one embodiment the camera head including camera lens is arranged to be moved relative to the mirror and in other embodiments the camera head is fixed and the mirrors themselves are arranged to be moved relative to the camera head; in one embodiment a further mirror is provided so as to deflect the optical path between the camera lens and copying table through a further 90°.

2 Claims, 5 Drawing Figures

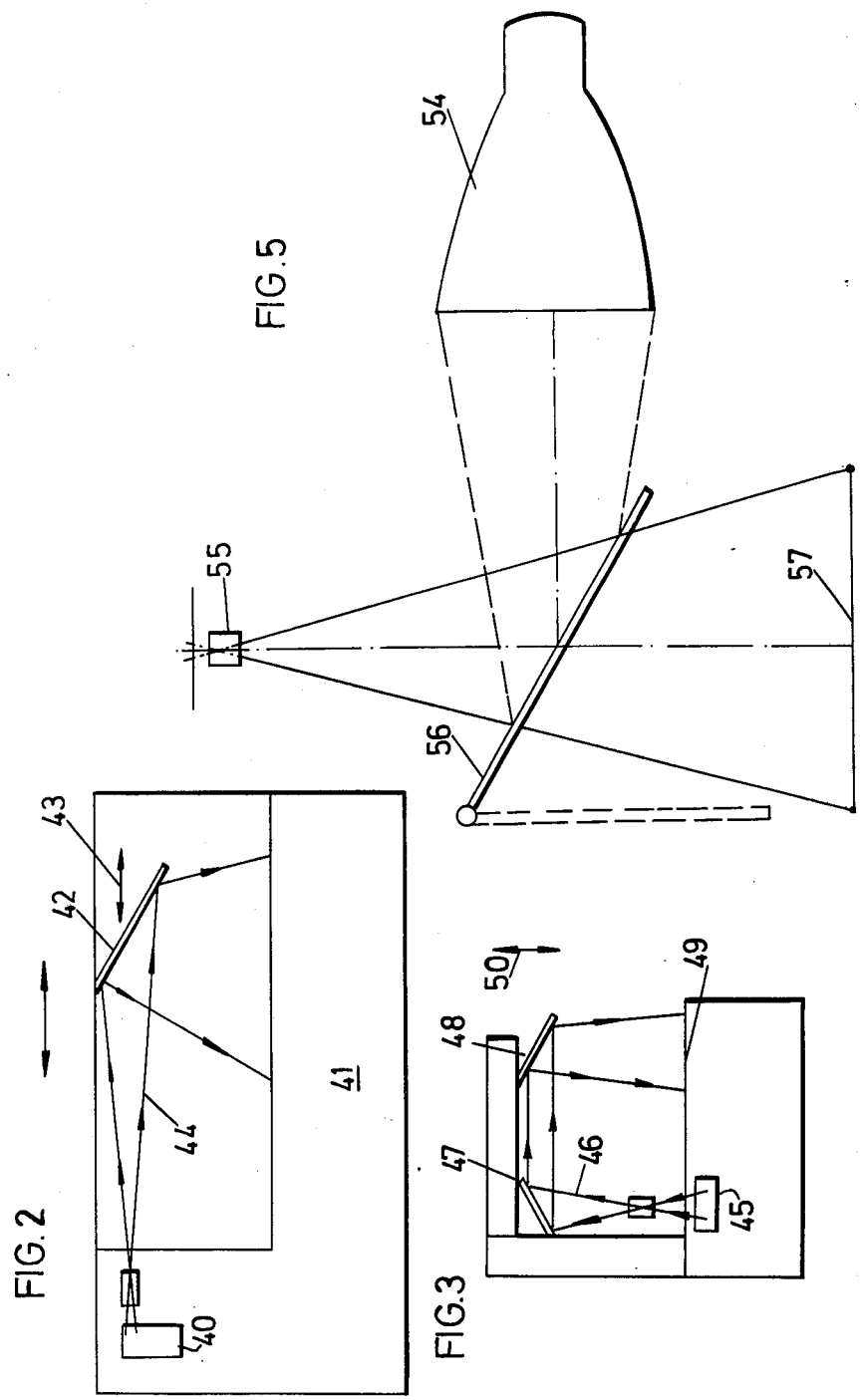

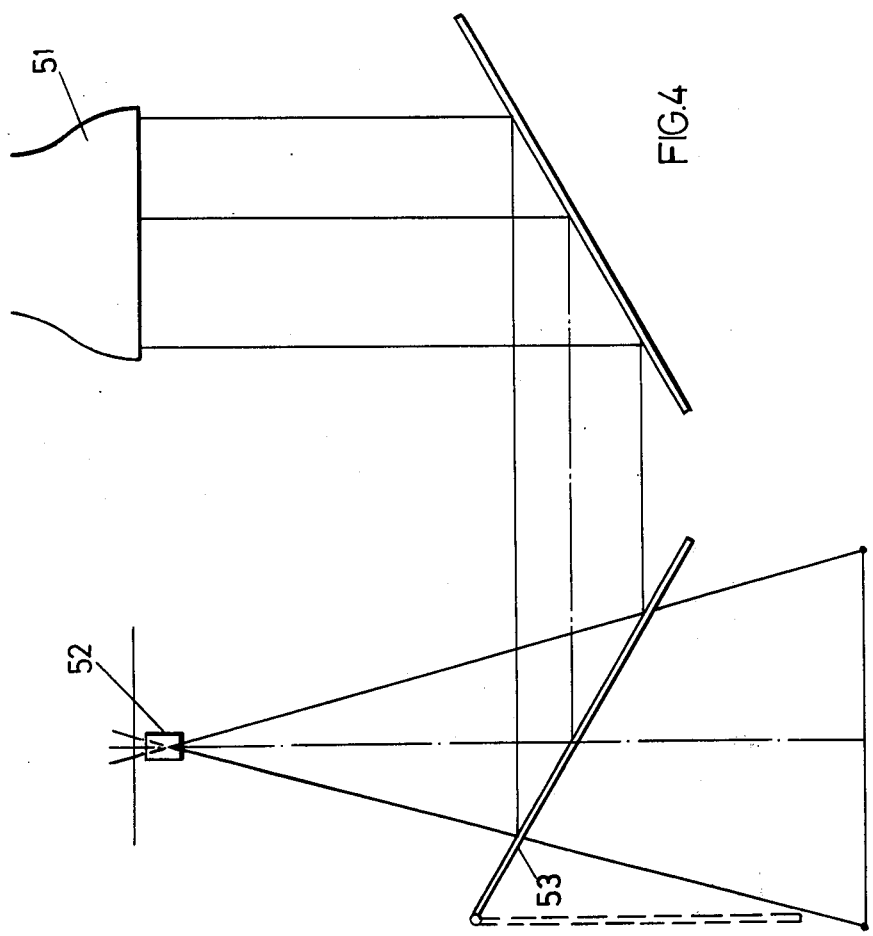

ALTERNATIVE CAMERA ARRANGEMENT

The present devices relate to microfilm or microfiche cameras recording images from one or more sources on a film or similar suitable material where continuously variable reduction ratios are required.

Since the resolution requirements of such cameras preclude the use of zoom lenses this has to be achieved by varying the distance between the object and image and the refocussing of the lens. In order to keep the resolution as high as possible the basic focal length of the lens cannot be varied beyond certain limits and more than one lens may have to be used when a very wide range of reduction ratios is required.

In such cameras there is also a requirement to allow the operator to feed the camera with the material to be copied from the front or side. This is important for many applications, not least for semi or fully automatic feeds.

Such cameras normally copy written or printed documents, drawings, sketches or other photographs, and these are most readily and clearly presented to the camera on a table like surface. It follows that the camera, or rather the "camera head", is effectively suspended above this table top. Furthermore this camera head must be lifted or lowered according to the reduction ratio which is to be used. To suspend a camera head rigidly at considerable and variable heights is not only costly but also produces an unwieldy instrument that cannot easily be used under normal lighting conditions.

Accordingly it is an object of the present invention to provide an arrangement to overcome these disadvantages by the use of a mirror to deflect the focal axis of the camera.

A further object of the present invention is to provide a quick and easily operable arrangement for changing from a cathode ray input to a conventional optical input and vice versa.

The present invention comprises a camera and means for holding a record to be copied at a copying station with an optical path therebetween, wherein a movable mirror is arranged in said optical path in order to deflect said optical path through an angle of 90°.

A cathode ray tube adapted to receive information for transmission to the camera can be so positioned that by movement of said mirror the information may be transmitted to said camera.

A further mirror may be provided to deflect said optical path through a further angle of 90°.

Hereafter the term "axis" will refer to an imaginary line through the centre of the document to be microfilmed and the "optical axis" will refer to a similar line through the optical system of a camera. In most arrangements these lines are a continuation of each other and will be called the "paraxial ray."

In one embodiment of the invention the paraxial ray hits a mirror above the document table. This mirror is angled in such a way that the light rays are deflected towards the camera head so that the paraxial ray which was vertical now preferably travels horizontally towards the optical axis of the camera. The camera as such can have a horizontal orientation or a vertical one, in the latter case another mirror accomplishes in a similar way this further deflection of the rays. The camera head or the mirror carriage is affixed to a precision and carefully controlled carriage which runs horizontally parallel to the paraxial ray. By this means the length of the paraxial ray can be lengthened or shortened which is equivalent to saying that the reduction ratio is being altered. The movement of the carriage or carriages activate cams or similar means which are linked to the lens in such a manner that it keeps the lens continuously in focus for any given reduction. Although mechanically more complex than the next embodiment, it keeps the mirrors to a minimum (for the very best resolutions no mirrors are used and such a camera is the subject of a separate specification). As the mirror is above the document table and in line with the camera, by making the mirror swing out of the way the camera can face, for example, a cathode ray tube, projector, or similar objects, so that alternatives can be photographed in addition to documents on the table. Thus pictures originating from a projector can easily be mixed with an accompanying written description onto one sheet of laminae film which is a microfiche or onto one roll of film.

In a second embodiment of the invention the camera is stationary and the mirror travels in the horizontal direction, in this case the camera takes the shape of an L. The base of the L which is lengthened forms a document table. As in the first embodiment the mirror when located above the document to be photographed effects the focussing of the lens.

When the resolution is not of paramount importance but the reduction ratios are, and equipment is to be kept reasonably compact, then the camera head and document axis can remain in line.

In a third embodiment of the invention two mirrors are inclined to each other in such a way to bring the ray back parallel but displaced to the original deflected paraxial ray and finally a further mirror bends the ray by 90° back on to the original axis to face the document to be photographed. Thus, by simply moving the inclined mirrors away or nearer to the optical axis the reduction ratios are varied. This arrangement has a doubling effect so that considerable variations in focal lengths can be achieved with relatively small movements of the linked inclined two mirrors. Again one or the other of the mirrors can be swung out of the way for cathode ray tube or similar photography.

In another embodiment of the invention camera head faces upwards, the paraxial rays hit a mirror and are deflected by 90°. These rays are then picked up by another larger mirror which is above the document table and inclined at 45°. This higher mirror can be housed so as to form a shield to extraneous lighting. By moving the camera height up and down with its associated fixing device, variable reduction rates can be achieved.

The invention will now be described with reference to the accompanying drawings in which:

FIG. 1 is a diagramatic side view of a camera according to a first embodiment of the invention, FIG. 2 is a diagramatic side view of a camera according to a second embodiment of the invention, FIG. 3 is a diagramatic side view of a camera according to a third embodiment of the invention, FIG. 4 is a diagramatic side view of a camera according to a fourth embodiment of the invention and FIG. 5 is a diagram of a further embodiment of the invention.

In FIG. 1, there is shown the first embodiment of the invention in which a camera 20 is mounted for horizontal movement along a horizontal document copying table 30, which forms means for holding a record to be copied. The optical axis 21 of the camera extends from the camera and is deflected through 90° by mirrors 32 and/or 39 (the mirrors 32 and 39 may be semi or fully silvered), along axes 22 and 23 respectively on to the copying surface 30, overlay or transparency (not shown). The axes 21 and 22 or 23 form the paraxial ray path.

Within the camera is a film 37, rotating masking plate 36, rotary lens holder or lens turret 35 and shutters 34. The camera can be focussed on the record to be copied on the copying table 30 or alternatively on a cathode ray tube 31. The source for the camera to copy can also be a laser beam. Selection of the copying source is achieved by movement of the inclined mirrors 32 and/or 39.

It will be seen in FIG. 1 that focussing of the camera is achieved by movement of the camera 20 on its carriage 33 and that by bending the paraxial ray through 90° a considerably long focal length can be achieved.

In FIG. 2 a second embodiment of the invention is shown in which a camera head 40 is fixed in relation to a horizontal document copying table 41 which forms the means for holding a record to be copied. Fixing of the camera is achieved by movement of a mirror 42 in a horizontal direction 43. This movement of the mirror 42 will clearly be seen to lengthen or shorten the paraxial ray 44.

In FIG. 3 a third embodiment of the invention is shown facing vertically upwards and the paraxial ray 46 is turned through the first 90° by mirror 47 and a second 90° by mirror 48 so as to return the paraxial ray 46 back downwards on to a horizontal copying table 49 adjacent to the camera 45. Mirror movement is effected in a vertical direction 50 so as to achieve focussing of the camera. In this arrangement the size of the whole arrangement can be considerably reduced over the arrangement shown in FIG. 2.

In FIG. 4 an arrangement is shown where a cathode ray tube 51, which could also be a laser beam transmitter, is mounted in the same access as camera lens 52 and selection of direct copying or C.R.T./Laser can be effected by movement of a mirror 53.

FIG. 5 shows a further arrangement in which a cathode ray tube 54 is arranged with its access at right angles to camera lens 55. The arrangement being such that a mirror 56 can enable a record on the copying table 57 to be recorded by the camera and also combined with a transmission from the cathode ray tube 54.

What I claim is:

1. An image recording device comprising a camera head including a photographic film, a lens and a shutter; an optical projection means adapted to receive information for transmission to said camera head disposed along the optical axis of said camera head; a horizontally disposed table adapted to hold documents for copying, said camera head and said table fixedly oriented so that the optical axis of the camera head intersects the document axis at a 20° angle; a fully reflecting mirror disposed between said camera head and said projection means at the intersection of said optical axis and said document axis and oriented so as to merge said axes; means to move said mirror along the optical axis of said camera head thereby altering the reduction ratio of said camera; and means to remove said mirror from the optical axis whereby information received by said optical projection means may be transmitted to the camera head for recordation when the mirror is removed from the optical axis and a document image may be transmitted to the camera head for recordation when the mirror is in place in the optical axis.

2. An image recording device comprising a camera head including a photographic film, a lens and a shutter; a cathode ray tube adapted to receive information for transmission to said camera head disposed along the optical axis of said camera head; a horizontally disposed table adapted to hold documents for copying, said camera head and said table oriented so that the optical axis of the camera head intersects the document axis at a 90° angle; a fully reflecting mirror disposed between said camera head and said cathode ray tube at the intersection of said optical axis and said document axis and oriented so as to merge said axes; carriage means to move said camera head relative to said document table and to said mirror thereby altering the reduction ratio of said camera; and means to remove said mirror from the optical axis whereby information received by said cathode ray tube may be transmitted to the camera head for recordation when the mirror is removed from the optical axis and a document image may be transmitted to the camera head for recordation when the mirror is in place in the optical axis.

* * * * *

UNITED STATES PATENT AND TRADEMARK OFFICE
CERTIFICATE OF CORRECTION

PATENT NO. : 4,074,935
DATED : February 21, 1978
INVENTOR(S) : Harry Arthur Hele Spence-Bate It is certified that error appears in the above-identified patent and that said Letters Patent are hereby corrected as shown below:

In claim 1, line 9; "20°" should read --90°--.

Signed and Sealed this

Fourteenth Day of November 1978

[SEAL]

Attest:

RUTH C. MASON
*Attesting Officer*

DONALD W. BANNER
*Commissioner of Patents and Trademarks*